United States Patent
Borgerson et al.

(10) Patent No.: US 8,292,767 B2
(45) Date of Patent: *Oct. 23, 2012

(54) POWERTRAIN HAVING A MULTI-SPEED TRANSMISSION

(75) Inventors: James B. Borgerson, Clarkston, MI (US); Donald L. Dusenberry, Farmington Hills, MI (US); Andrew W. Phillips, Rochester, MI (US); Scott H. Wittkopp, Ypsilanti, MI (US); Clinton E. Carey, Highland, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 600 days.

This patent is subject to a terminal disclaimer.

(21) Appl. No.: 12/463,713

(22) Filed: May 11, 2009

(65) Prior Publication Data

US 2009/0305838 A1    Dec. 10, 2009

Related U.S. Application Data

(60) Provisional application No. 61/058,781, filed on Jun. 4, 2008.

(51) Int. Cl.
*F16H 3/72* (2006.01)
*F16H 3/44* (2006.01)
(52) U.S. Cl. ............... 475/5; 475/282; 475/288
(58) Field of Classification Search ............. 475/5, 282, 475/283, 288, 289, 296, 297, 330
See application file for complete search history.

(56) References Cited

U.S. PATENT DOCUMENTS

| | | | |
|---|---|---|---|
| 6,176,803 B1 | 1/2001 | Meyer et al. | |
| 6,558,287 B2 | 5/2003 | Hayabuchi et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 7,115,062 B2 * | 10/2006 | Klemen | 475/278 |
| 7,163,484 B2 | 1/2007 | Klemen | |
| 7,699,741 B2 * | 4/2010 | Hart et al. | 475/271 |
| 7,736,264 B2 * | 6/2010 | Moorman et al. | 475/277 |
| 7,775,931 B2 * | 8/2010 | Carey et al. | 475/276 |
| 8,012,059 B2 * | 9/2011 | Borgerson | 475/283 |
| 2005/0090362 A1 | 4/2005 | Abe et al. | |
| 2006/0270513 A1 | 11/2006 | Klemen | |
| 2006/0270516 A1 | 11/2006 | Klemen | |
| 2008/0011529 A1 | 1/2008 | Hoher et al. | |
| 2008/0227587 A1 | 9/2008 | Carey et al. | |
| 2009/0209390 A1 * | 8/2009 | Carey et al. | 475/282 |
| 2009/0209391 A1 * | 8/2009 | Carey et al. | 475/282 |
| 2009/0264238 A1 * | 10/2009 | Carey et al. | 475/198 |
| 2009/0280941 A1 | 11/2009 | Borgerson et al. | |

FOREIGN PATENT DOCUMENTS

DE    102005032001 A1    2/2007

* cited by examiner

*Primary Examiner* — Roger Pang

(57) ABSTRACT

A powertrain is provided having a multi-speed transmission. The transmission is provided having an input member, an output member, four planetary gear sets, a plurality of coupling members and a plurality of torque transmitting devices. Each of the planetary gear sets includes a sun gear member, a planet carrier member, and a ring gear member. The torque transmitting devices include clutches and brakes arranged within a transmission housing.

25 Claims, 3 Drawing Sheets

| CLUTCH | ZONE LOCATION | | | | | |
|---|---|---|---|---|---|---|
| | A | B | C | D | E | F |
| B1 | X | | | | X | X |
| B2 | X | | | | X | X |
| C1 | | | X | X | X | |
| C2 | | | | X | | |
| C3 | | | | X | | X |

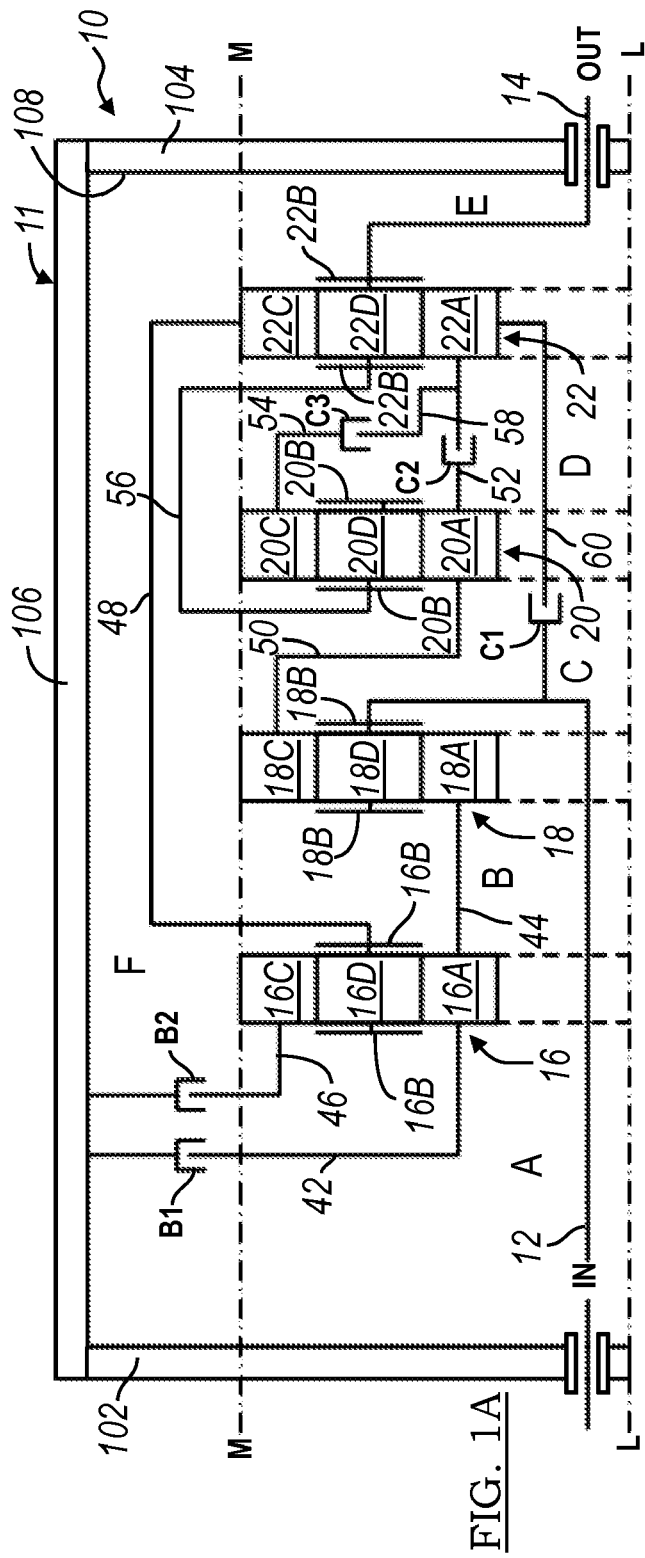

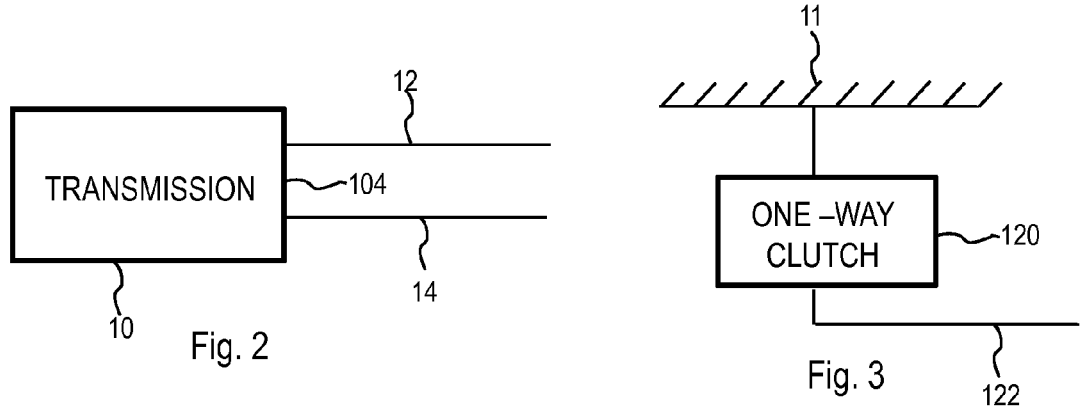
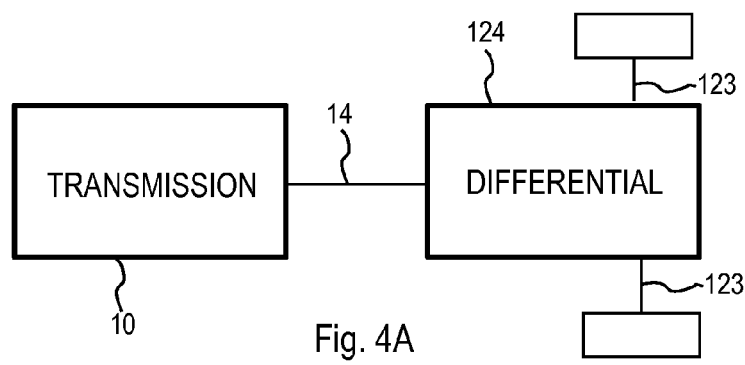
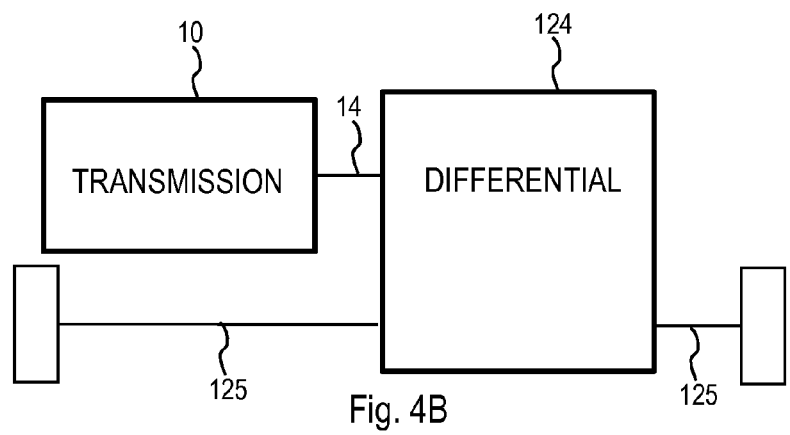

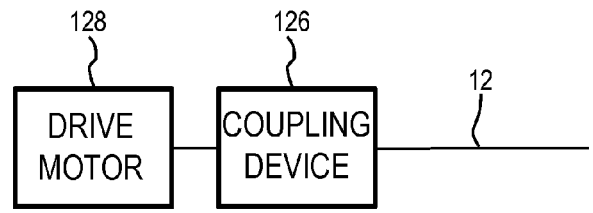
Fig. 5
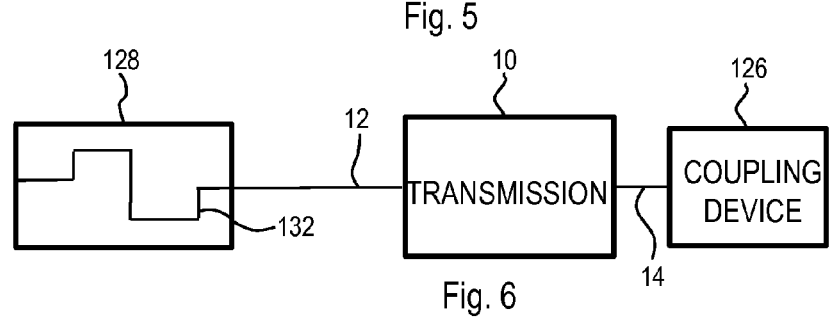
Fig. 6
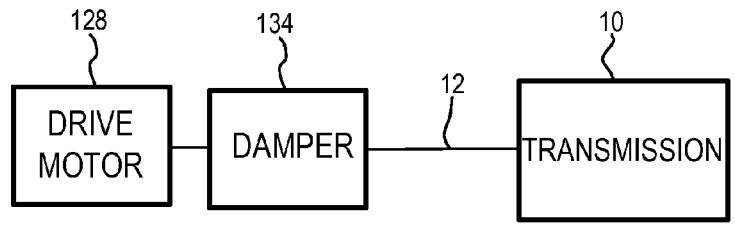
Fig. 7
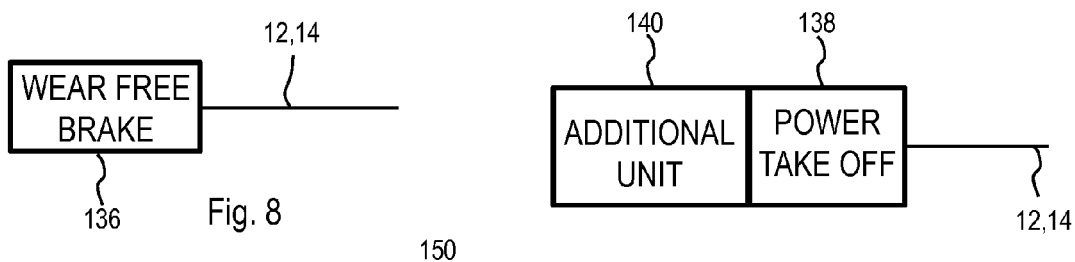
Fig. 8
Fig. 9
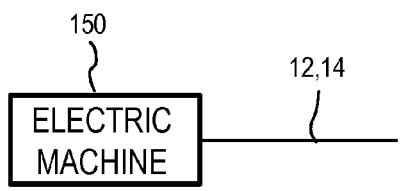
Fig. 10

POWERTRAIN HAVING A MULTI-SPEED TRANSMISSION

CROSS-REFERENCE TO RELATED APPLICATIONS

This application claims the benefit of U.S. Provisional Application No. 61/058,781, filed on Jun. 4, 2008, which is hereby incorporated in its entirety herein by reference.

FIELD

The invention relates generally to a multiple speed transmission having a plurality of planetary gear sets and a plurality of torque transmitting devices and more particularly to a transmission having eight or more speeds.

BACKGROUND

The statements in this section merely provide background information related to the present disclosure and may or may not constitute prior art.

A typical multiple speed transmission uses a combination of a plurality of torque transmitting mechanisms, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A powertrain is provided having a multi-speed transmission. The transmission is provided having an input member, an output member, a plurality of planetary gear sets, and a plurality of torque-transmitting mechanisms. The plurality of planetary gear sets each have a sun gear member, a planetary carrier member and a ring gear member. The powertrain may be configured as a front wheel drive powertrain where the input and output shafts of the transmission are provided on the same side. Alternatively, the powertrain of the present invention may be configured as a rear wheel drive powertrain having the input and output shafts of the transmission on opposite sides of the transmission.

In another aspect of the present invention, a one-way clutch is provided which is connectable to the transmission, in accordance with an embodiment of the present invention.

In still another aspect of the present invention, the transmission is coupled to a differential in a first arrangement where the transmission and transmission output member is perpendicular to a pair of drive axles, in accordance with an embodiment of the present invention.

In still another aspect of the present invention, the transmission is coupled to a differential in a second arrangement where the transmission and transmission output member is parallel to a pair of drive axles, in accordance with an embodiment of the present invention.

In still another aspect of the present invention, a drive motor and a coupling device are connectable to the transmission, in accordance with an embodiment of the present invention.

In still another aspect of the present invention, the powertrain of the present invention has a transmission arranged between a drive motor and a coupling device, in accordance with an embodiment of the present invention.

In still another aspect of the present invention, the powertrain of the present invention has a vibration damper arranged between a drive motor and a transmission, in accordance with an embodiment of the present invention.

In yet another aspect of the present invention, a wear free brake is connectable to the transmission, in accordance with an embodiment of the present invention.

In yet another aspect of the present invention, a power-take-off is connectable to the transmission, in accordance with an embodiment of the present invention.

In yet another aspect of the present invention, an electric machine is connectable to the transmission, in accordance with an embodiment of the present invention.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1A is a schematic diagram of a gear arrangement for a multi-speed transmission, according to the principles of the present invention;

FIG. 1B is a chart showing the locations of the torque transmitting devices for the arrangement of planetary gear sets of the transmission shown in FIG. 1A, in accordance with the embodiments of the present invention.

FIG. 2 is a diagrammatic view of a transmission of the present invention in which the input and output shafts are provided on the same side of the transmission housing, in accordance with an embodiment of the present invention;

FIG. 3 is a diagrammatic view of a one-way clutch connectable to the transmission of the present invention, in accordance with an embodiment of the present invention;

FIG. 4A is a diagrammatic view of a transmission of the present invention coupled to a differential in a first arrangement, in accordance with an embodiment of the present invention;

FIG. 4B is a diagrammatic view of a transmission of the present invention coupled to a differential in a second arrangement, in accordance with an embodiment of the present invention;

FIG. 5 is a diagrammatic view of a drive motor and a coupling device connectable to the transmission of the present invention, in accordance with an embodiment of the present invention;

FIG. 6 is a diagrammatic view of the powertrain of the present invention having a transmission arranged between a drive motor and a coupling device, in accordance with an embodiment of the present invention;

FIG. 7 is a diagrammatic view of the powertrain of the present invention having a vibrational damper arranged between a drive motor and a transmission, in accordance with an embodiment of the present invention;

FIG. 8 is a diagrammatic view of a wear free brake connectable to the transmission of the present invention, in accordance with an embodiment of the present invention;

FIG. 9 is a diagrammatic view of a power-take-off connectable to the transmission of the present invention, in accordance with an embodiment of the present invention; and FIG. 10 is a diagrammatic view of an electric machine connectable to the transmission of the present invention, in accordance with an embodiment of the present invention.

DETAILED DESCRIPTION

The following description is merely exemplary in nature and is not intended to limit the present disclosure, application, or uses.

Referring now to FIG. 1A, an embodiment of the present invention includes a multi-speed transmission 10. The transmission 10 is illustrated as a rear-wheel drive or longitudinal transmission, though various other types of transmission configurations may be employed. The transmission 10 includes a transmission housing 11, an input shaft or member 12, and an output shaft or member 14. The input member 12 is continuously connected to an engine (not shown) or to a turbine of a torque converter (not shown). The output member 14 is continuously connected with a final drive unit (not shown) or transfer case (not shown).

The transmission 10 includes a first planetary gear set 16, a second planetary gear set 18, a third planetary gear set 20, and a fourth planetary gear set 22. The planetary gear sets 16, 18, 20 and 22 are connected between the input member 12 and the output member 14. In a preferred embodiment of the present invention, the planetary gear set 16 includes a sun gear member 16A, a ring gear member 16C, and a planet carrier member 16B that rotatably supports a set of planet or pinion gears 16D (only one of which is shown). The pinion gears 16D are each configured to intermesh with both the sun gear member 16A and the ring gear member 16C. The sun gear member 16A is connected for common rotation with a first shaft or intermediate member 42 and a second shaft or intermediate member 44. It should be appreciated that the first intermediate member 42 is connected for common rotation with the second intermediate member 44 and that the intermediate members 42 and 44 may form one single shaft or multiple shafts through one or more members of the planetary gear sets, as seen throughout the several views. The ring gear member 16C is connected for common rotation with a third shaft or intermediate member 46. The planet carrier member 16B is connected for common rotation with a fourth shaft or intermediate member 48.

The planetary gear set 18 includes a sun gear member 18A, a ring gear member 18C, and a planet carrier member 18B that rotatably supports a set of planet or pinion gears 18D. The pinion gears 18D are each configured to intermesh with both the sun gear member 18A and the ring gear member 18C. The sun gear member 18A is connected for common rotation with the second intermediate member 44. The ring gear member 18C is connected for common rotation with a fifth shaft or intermediate member 50. The planet carrier member 18B is connected for common rotation with the input member 12.

The planetary gear set 20 includes a sun gear member 20A, a ring gear member 20C, and a carrier member 20B that rotatably supports a set of planet or pinion gears 20D. The pinion gears 20D are each configured to intermesh with both the sun gear member 20A and the ring gear member 20C. The sun gear member 20A is connected for common rotation with the fifth shaft or intermediate member 50 and with a sixth shaft or intermediate member 52. It should be appreciated that the fifth intermediate member 50 is connected for common rotation with the sixth intermediate member 52 and that the intermediate members 50 and 52 may form one single shaft or multiple shafts through one or more members of the planetary gear sets, as seen throughout the several views. The ring gear member 20C is connected for common rotation with a seventh shaft or intermediate member 54. The planet carrier member 20B is connected for common rotation with an eighth shaft or intermediate member 56. It should be appreciated that the eighth intermediate member 56 is connected for common rotation with the output member 14 and that the eighth intermediate members 56 and the output member 14 may form one single shaft or multiple shafts through one or more members of the planetary gear sets, as seen throughout the several views.

The planetary gear set 22 includes a sun gear member 22A, a ring gear member 22B, and a planet carrier member 22B that rotatably supports a set of planet or pinion gears 22D. The pinion gears 22D are each configured to intermesh with both the sun gear member 22A and the ring gear member 22C. The sun gear member 22A is connected for common rotation with a ninth shaft or intermediate member 58 and a tenth shaft or intermediate member 60. It should be appreciated that the ninth intermediate member 58 is connected for common rotation with the tenth intermediate member 60 and that the intermediate members 58 and 60 may form one single shaft or multiple shafts through one or more members of the planetary gear sets, as seen throughout the several views. The ring gear member 22C is connected for common rotation with the fourth intermediate member 48. The planet carrier member 22B is connected for common rotation with the output member 14 and with the eighth intermediate member 56.

The transmission 10 includes a variety of torque-transmitting mechanisms or devices including a first clutch C1, a second clutch C2, a third clutch C3, a first brake B1 and a second brake B2. The first clutch C1 is selectively engagable to connect the input member 12 to the tenth intermediate member 60. The second clutch C2 is selectively engagable to connect the sixth intermediate member 52 to the ninth intermediate member 58. The third intermediate clutch C3 is selectively engagable to connect the seventh intermediate member 54 to the ninth intermediate member 58. The first brake B1 is selectively engagable to connect the first intermediate member 42 to the transmission housing 11 to restrict rotation of the first intermediate member 42 relative to the transmission housing 11. Finally, the second brake B2 is selectively engagable to connect the third intermediate member 46 to the transmission housing 11 to restrict rotation of the third intermediate member 46 relative to the transmission housing 11.

The transmission 10 is capable of transmitting torque from the input member 12 to the output member 14 in at least eight forward torque ratios and one reverse torque ratio. Each of the forward torque ratios and the reverse torque ratio are attained by engagement of one or more of the torque-transmitting mechanisms (i.e. first intermediate clutch C1, second intermediate clutch C2, third intermediate clutch C3, first brake B1 and second brake B2). Those skilled in the art will readily understand that a different speed ratio is associated with each torque ratio. Thus, eight forward speed ratios may be attained by the transmission 10.

The transmission housing 11 includes a first end wall 102, a second end wall 104, and a third wall 106. The third wall 106 interconnects between the first and second end walls 102 and 104 to provide a space or cavity 108 in which planetary gear sets 16, 18, 20, and 22 and the torque-transmitting mechanisms C1, C2, C3, B1, and B2 are located. Further, the cavity 108 has a plurality of areas or Zones A, B, C, D, E, and F in which the plurality of torque transmitting mechanisms C1, C2, C3, B1, and B2 will be specifically positioned, in accordance with the preferred embodiments of the present invention.

As shown in FIG. 1A, Zone A is defined by the area or space bounded: axially on the left by the first end wall 102, on the right by planetary gear set 16, radially inward by a reference line "L" which is a longitudinal line that is axially aligned with the input shaft 12, and radially outward by a reference line "M" which is a longitudinal line that extends adjacent an outer diameter or outer periphery of the planetary gear sets 16, 18, 20, and 22. While reference line "M" is illustrated as a straight line, it should be appreciated that reference line "M" follows the outer periphery of the planetary gear sets 16, 18, 20, and 22, and accordingly may be stepped or non-linear depending on the location of the outer periphery of each of the planetary gear sets 16, 18, 20, and 22. Zone B is defined by the area bounded: axially on the left by planetary gear set 16, axially on the right by the planetary gear set 18, radially outward by reference line "M", and radially inward by reference line "L". Zone C is defined by the area bounded: axially on the left by the planetary gear set 18, axially on the right by the planetary gear set 20, radially outward by reference line "M", and radially inward by reference line "L". Zone D is defined by the area bounded: axially on the left by the planetary gear set 20, axially on the right by the planetary gear set 22, radially outward by reference line "M", and radially inward by reference line "L". Zone E is defined by the area bounded: axially on the left by the planetary gear set 22, axially on the right by the second end wall 104, radially outward by reference line "M", and radially inward by reference line "L". Zone F is defined by the area bounded: axially on the left by the first end wall 102, axially on the right by the second end wall 104, radially inward by reference line "M" and radially outward by the third wall 106. As will be described and illustrated hereinafter, planetary gear sets 16, 18, 20, and 22 will change positions within the transmission cavity 108, however, the Zones described above will not change and will remain the same as shown throughout the Figures.

In the arrangement of the transmission 10 shown in FIG. 1A, the planetary gear sets 16, 18, 20, and 22 are longitudinally arranged in the following order from left to right: 16-18-20-22. Specifically, the planetary gear set 16 is disposed closest to the wall 102, the planetary gear set 22 is disposed closest to the wall 104, the planetary gear set 18 is adjacent the planetary gear set 16, and the planetary gear set 20 is disposed between the planetary gear sets 18 and 22. The torque-transmitting mechanisms are intentionally located within specific Zones in order to provide advantages in overall transmission size, packaging efficiency, and reduced manufacturing complexity. In the particular example shown in FIG. 1A, the torque-transmitting mechanism C1 is disposed within Zone C, the torque-transmitting mechanisms C2 and C3 are disposed within Zone D, and the torque-transmitting mechanisms B1 and B2 are disposed within Zone F.

However, the present invention contemplates other embodiments where the torque-transmitting mechanisms C1, C2, C3, B1, and B2 are disposed in the other Zones. The feasible locations of the torque-transmitting devices C1, C2, C3, B1, and B2 relative to the Zones are illustrated in the chart shown in FIG. 1B. An "X" in the chart indicates that the present invention contemplates locating the particular torque-transmitting device in any of the referenced Zones.

In the embodiment shown in FIG. 1A, the first planetary gearset 16 is the gearset of the transmission 10 nearest to the input shaft or member 12, and the fourth planetary gearset 22 is the gearset nearest to the shaft or member 14 of the transmission. Moreover, the input shaft or member 12 and the output shaft or member 14 are arranged co-axially with respect to each other. It will be obvious to the person skilled in the art that this transmission can be modified without great effort so that the input and output shafts are no longer arranged co-axially with respect to each other, but as shown in FIG. 2, axially parallel or at an angle with respect to each other. With an arrangement of this type, the person skilled in the art will, if needed, arrange the drive of the transmission close to the fourth planetary gearset 22, i.e., on the side of the fourth planetary gearset 22 that faces away from the planetary gearset 20.

In principle, the spatial arrangement of the torque-transmitting devices within the transmission is optional in the embodiment of a multi-speed transmission, according to the invention shown in FIGS. 1A and 1B, and is limited only by the measurements and the external shape of the transmission housing.

The following applies to the illustrated or described embodiments for an inventive multi-speed transmission 10.

As shown in FIG. 3, the present invention provides additional one-way clutches 120 at any suitable position in the multi-speed transmission 10 between a shaft or member 122 and the transmission housing 11 or in order to connect any two shafts or members, if necessary.

An axle differential and/or a distributor differential 124 can be arranged on either the input side or the output side of transmission 10, as shown in FIGS. 4A and 4B. Moreover, transmission 10 may be arranged longitudinally within a vehicle and perpendicular with the axles 123, as shown in FIG. 4A, or arranged transversely in the vehicle and parallel with the axles 125, as shown in FIG. 4B.

In an advantageous further embodiment, shown in FIG. 5, the input shaft or member 12 can be separated, if needed, by a coupling device 126 of a drive motor 128. The coupling device 124 may be a torque converter, a hydraulic clutch, a dry starting clutch, a wet starting clutch, a magnetic particle clutch, or a centrifugal clutch.

As shown in FIG. 6, coupling device 126 may be arranged within the powertrain behind the transmission 10, where, in this case, the input shaft 12 is directly and permanently connected to the crankshaft 132 of the drive motor 128.

In addition, the multi-speed transmission 10 according to the present invention, as shown in FIG. 7, provides the possibility of arranging a torsional vibration damper 134 between the drive motor 128 and the transmission 10.

Within the scope of an additional embodiment of the invention, as shown in FIG. 8, a wear-free brake 136, such as a hydraulic or electric retarder or the like can be arranged on the input shaft 12 or the output shaft 14, which is particularly important for use in commercial vehicles.

In addition, a power take-off 138 can be provided on each shaft, as shown in FIG. 9, preferably on the input shaft 12 or the output shaft 14, in order to drive additional units 140 on each shaft.

The torque-transmitting devices C1, C2, C3, B1, and B2 may be configured as power-shifting clutches or brakes. In particular, frictional clutches or brakes, such as disc clutches, band brakes and/or conical clutches, can be used. In addition, friction-based brakes and or/clutches, such as synchronizers or claw clutches, can be used as torque-transmitting devices.

A further advantage of the multi-speed transmission 10, described herein and shown in FIG. 10, is that an electric machine or motor 150 can also be affixed to each shaft 12, 14 as a generator and/or an additional drive unit.

The description of the invention is merely exemplary in nature and variations that do not depart from the gist of the invention are intended to be within the scope of the invention. Such variations are not to be regarded as a departure from the spirit and scope of the invention.

The invention claimed is:

1. A powertrain comprising:
an engine; and
a transmission having:
a transmission input member;
a transmission output member;
a first, second, third and fourth planetary gear set each planetary gear set having a sun gear member, a ring gear member and a planet carrier member supporting a plurality of planet gears each configured to intermesh with both the sun gear member and the ring gear member, wherein the transmission input member is continuously interconnected with the planet carrier member of the second planetary gear set, and the transmission output member is continuously interconnected with the planet carrier member of the fourth planetary gear set and the planet carrier member of the third planetary gear set, and wherein the sun gear member of the first planetary gear set is continuously interconnected with the sun gear member of the second planetary gear set, the ring gear member of the second planetary gear set is continuously interconnected with the sun gear member of the third planetary gear set, the planet carrier member of the first planetary gear set is continuously interconnected with the ring gear member of the fourth planetary gear set;
a first clutch selectively engageable to interconnect the sun gear member of the fourth planetary gear set to the planet carrier member of the second planetary gear set and the transmission input member;
a second clutch selectively engageable to interconnect the sun gear member of the fourth planetary gear set to the sun gear member of the third planetary gear set and the ring gear member of the second planetary gear set;
a third clutch selectively engageable to interconnect the sun gear member of the fourth planetary gear set to the ring gear member of the third planetary gear set;
a first brake selectively engageable to interconnect the sun gear member of the first planetary gear set and the sun gear member of the second planetary gear set to the transmission housing;
a second brake selectively engageable to interconnect the ring gear member of the first planetary gear set to the transmission housing; and
wherein the clutches and brakes are selectively engageable to establish at least eight forward speed ratios and at least one reverse speed ratio between the transmission input member and the transmission output member; and
a differential connected between the transmission output member and a pair vehicle axles for receiving an output torque from the transmission and distributing the torque to the pair of vehicle axles.

2. The powertrain of claim 1 wherein the transmission further comprises a transmission housing having a first wall, a second wall, and a third wall extending between the first and second walls and wherein the first planetary gear set is adjacent the first wall, the second planetary gear set is adjacent the first planetary gear set, the fourth planetary gear set is adjacent the second wall, and the third planetary gear set is between the second and fourth planetary gear sets.

3. The powertrain of claim 2 wherein the transmission housing further comprises a first area defined radially inward from an outer periphery of the planetary gear sets and axially bounded by the first wall and the first planetary gear set, a second area defined radially inward from the outer periphery of the planetary gear sets and axially bounded by the first and second planetary gear sets, a third area defined radially inward from the outer periphery of the planetary gear sets and axially bounded by the second and third planetary gear sets, a fourth area defined radially inward from the outer periphery of the planetary gear sets and axially bounded by the third and fourth planetary gear sets, a fifth area defined radially inward from the outer periphery of the planetary gear sets and axially bounded by the fourth planetary gear set and the second wall, and a sixth area defined radially inward from the third wall and radially outward from the outer periphery of the planetary gear sets and axially bounded by the first wall and the second wall.

4. The powertrain of claim 3 wherein the first clutch is located in at least one of the third, fourth, and fifth areas, the second clutch is located in the fourth area, the third clutch is located in at least one of the fourth and sixth areas, the first brake is located in at least one of the first, fifth, and sixth areas, and the second brake is located in at least one of the first, fifth, and sixth areas.

5. The powertrain of claim 4 wherein the first clutch is located in the third area, the second clutch is located in the fourth area, the third clutch is located in the fourth area, the first brake is located in the sixth area and the second brake is located in the sixth area.

6. The powertrain of claim 1 further comprising a torsional vibration damper connected to the engine output shaft for reducing vibration in the engine output shaft.

7. The powertrain of claim 2 wherein the transmission input shaft and the transmission output shaft are both disposed on at least one of the first, second and third walls.

8. The powertrain of claim 1 wherein at least one of the first and second brakes is a one-way clutch for connecting at least one of a shaft and a member of the planetary gear sets to the transmission housing.

9. The powertrain of claim 1 wherein the transmission is disposed at least one of parallel with the pair of vehicle axles and perpendicular with the vehicle axles.

10. The powertrain of claim 1 further comprising a coupling device for selectively connecting to and transmitting torque from at least one of an engine output member of the engine and the transmission output member wherein the coupling device is at least one of a torque converter, a hydraulic clutch, a dry starting clutch, a wet starting clutch, a magnetic particle clutch and a centrifugal clutch.

11. The powertrain of claim 1 further comprising a wear-free brake connected to at least one of the transmission input and output members, wherein the wear-free brake is at least one of a hydraulic and electric retarder.

12. The powertrain of claim 1 further comprising a power take-off connected to at least one the transmission input member and the transmission output member for transferring torque to an additional drive unit.

13. The powertrain of claim 1 further comprising an electric machine connected to at least one the transmission input member and the transmission output member for providing a driving torque.

14. A powertrain comprising:
an internal combustion engine;
a transmission having:
a transmission input member;
a transmission output member;
a first, second, third and fourth planetary gear set each planetary gear set having a sun gear member, a ring gear member and a planet carrier member supporting a plurality of planet gears each configured to intermesh with both the sun gear member and the ring gear member, wherein the transmission input member is continuously interconnected with the planet carrier member of the second planetary gear set, and the transmission output member is continuously interconnected with the planet carrier member of the fourth planetary gear set and the planet carrier member of the third planetary gear set, and wherein the sun gear member of the first planetary gear set is continuously interconnected with the sun gear member of the second planetary gear set, the ring gear member of the second planetary gear set is continuously interconnected with the sun gear member of the third planetary gear set, the planet carrier member of the first planetary gear set is continuously interconnected with the ring gear member of the fourth planetary gear set;

a first clutch selectively engageable to interconnect the sun gear member of the fourth planetary gear set to the planet carrier member of the second planetary gear set and the transmission input member;

a second clutch selectively engageable to interconnect the sun gear member of the fourth planetary gear set to the sun gear member of the third planetary gear set and the ring gear member of the second planetary gear set;

a third clutch selectively engageable to interconnect the sun gear member of the fourth planetary gear set to the ring gear member of the third planetary gear set;

a first brake selectively engageable to interconnect the sun gear member of the first planetary gear set and the sun gear member of the second planetary gear set to the transmission housing;

a second brake selectively engageable to interconnect the ring gear member of the first planetary gear set to the transmission housing; and wherein the clutches and brakes are selectively engageable to establish at least eight forward speed ratios and at least one reverse speed ratio between the transmission input member and the transmission output member;

an electric machine connected to the transmission input member between the internal combustion engine and the transmission;

a coupling device connected between the electric machine and the transmission for transmitting torque generated by one of the engine and the electric machine to the transmission input shaft; and a differential connected between the transmission output member and a pair vehicle axles for receiving an output torque from the transmission and distributing the torque to the pair of vehicle axles.

15. The powertrain of claim 14 wherein the transmission further comprises a transmission housing having a first wall, a second wall, and a third wall extending between the first and second walls and wherein the first planetary gear set is adjacent the first wall, the second planetary gear set is adjacent the first planetary gear set, the fourth planetary gear set is adjacent the second wall, and the third planetary gear set is between the second and fourth planetary gear sets.

16. The powertrain of claim 15 wherein the transmission housing further comprises a first area defined radially inward from an outer periphery of the planetary gear sets and axially bounded by the first wall and the first planetary gear set, a second area defined radially inward from the outer periphery of the planetary gear sets and axially bounded by the first and second planetary gear sets, a third area defined radially inward from the outer periphery of the planetary gear sets and axially bounded by the second and third planetary gear sets, a fourth area defined radially inward from the outer periphery of the planetary gear sets and axially bounded by the third and fourth planetary gear sets, a fifth area defined radially inward from the outer periphery of the planetary gear sets and axially bounded by the fourth planetary gear set and the second wall, and a sixth area defined radially inward from the third wall and radially outward from the outer periphery of the planetary gear sets and axially bounded by the first wall and the second wall.

17. The powertrain of claim 16 wherein the first clutch is located in at least one of the third, fourth, and fifth areas, the second clutch is located in the fourth area, the third clutch is located in at least one of the fourth and sixth areas, the first brake is located in at least one of the first, fifth, and sixth areas, and the second brake is located in at least one of the first, fifth, and sixth areas.

18. The powertrain of claim 16 wherein the first clutch is located in the third area, the second clutch is located in the fourth area, the third clutch is located in the fourth area, the first brake is located in the sixth area and the second brake is located in the sixth area.

19. The powertrain of claim 14 further comprising a torsional vibration damper connected to an engine output shaft for reducing vibration in the engine output shaft.

20. The powertrain of claim 15 wherein the transmission input shaft and the transmission output shaft are both disposed on at least one of the first, second and third walls.

21. The powertrain of claim 14 wherein at least one of the first and second brakes is a one-way clutch for connecting at least one of a shaft and a member of the planetary gear sets to the transmission housing.

22. The powertrain of claim 14 wherein the transmission is disposed at least one of parallel with the pair of vehicle axles and perpendicular with the vehicle axles.

23. The powertrain of claim 14 wherein the coupling device is at least one of a torque converter, a hydraulic clutch, a dry starting clutch, a wet starting clutch, a magnetic particle clutch and a centrifugal clutch.

24. The powertrain of claim 14 further comprising a wear-free brake connected to at least one of the transmission input and output members, wherein the wear-free brake is at least one of a hydraulic and an electric retarder.

25. The powertrain of claim 14 further comprising a power take-off connected to at least one the transmission input member and the transmission output member for transferring torque to an additional drive unit.

* * * * *